May 9, 1939.                B. D. BEDFORD                 2,157,812
                         ELECTRIC VALVE CIRCUIT
                         Filed May 27, 1932
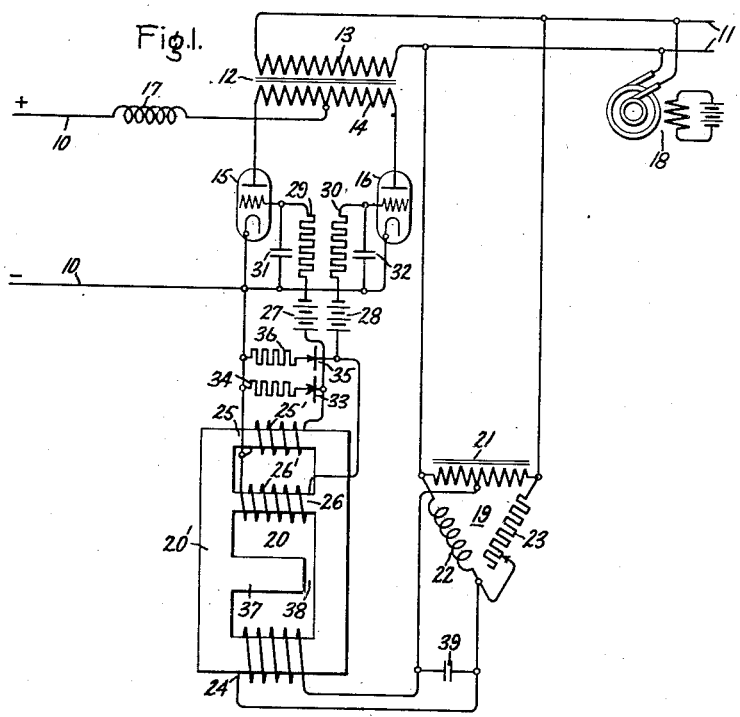
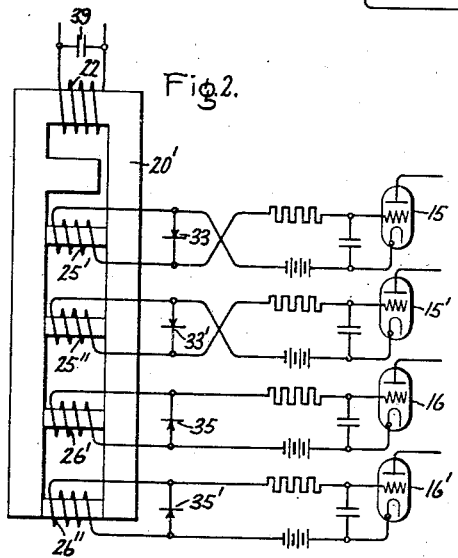
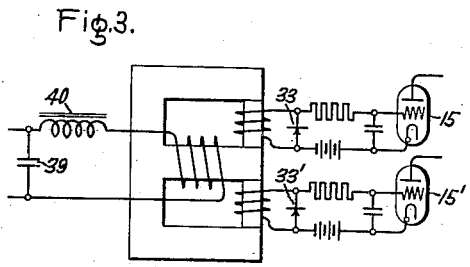
Inventor:
Burnice D. Bedford.
by Charles E. Mullen
His Attorney.

Patented May 9, 1939

2,157,812

UNITED STATES PATENT OFFICE 2,157,812

ELECTRIC VALVE CIRCUIT

Burnice D. Bedford, Schenectady, N. Y., assignor to General Electric Company, a corporation of New York Application May 27, 1932, Serial No. 614,134

12 Claims. (Cl. 175—363)

My invention relates to electric valve circuits and more particularly to excitation circuits for grid controlled electric valves.

In the use of grid controlled electric valves in electric translating circuits, it is customary to determine the periods of, and the extent of, the conductivity of an electric valve by determining the magnitude and polarity of its grid potential. This control is often effected cyclically, in cases where the anode-cathode circuit of the valve is included in an alternating or periodic current circuit, by impressing upon the control grid an alternating or periodic potential and varying the phase or magnitude, or both, of the periodic grid potential. In such arrangements, the grid is usually positive for some portion of the cycle of periodic control potential and negative for the remainder of the cycle. It is well known that current will normally flow in the grid circuit only when the grid is positive with respect to the cathode, with the exception of positive ion currents, in applications utilizing valves of the vapor electric discharge type, which ordinarily are of negligible value. The result is that the source of grid potential is not loaded during its negative half cycle. In case the grid of an electric valve is excited from a grid transformer winding, as is usually the case, it is decidedly disadvantageous to have it open circuited during the negative half cycle; for example, when utilizing valves of the vapor electric discharge type, considerable potential transients may appear in such a grid circuit which render a valve conductive in an improper sequence. Such transients may be occasioned by the sudden interruption of the positive ion current when a valve becomes nonconductive or by surges in adjacent electric circuits, or by other well known causes. Furthermore, it is often desirable to include one or more capacitors in the grid circuit of a vapor electric valve for certain purposes and an unloaded secondary winding of a transformer will tend to oscillate with such a capacitor and thus render the valve conductive when it should be maintained non-conductive. In certain cases also, a flow of rectified current in the grid circuit may have an undesirable saturating effect upon the grid transformer. In cases where a number of grids are excited from a number of windings on a single magnetic core member, the effect of an open circuit on one or more of the windings is to increase the reactance of the transformer and thus decrease the amplitude of the positive impulses of certain of the other windings utilized to excite other electric valves.

It is an object of my invention, therefore, to provide an improved excitation circuit for the control of an electric valve used in an electric translating circuit which will overcome the above-mentioned disadvantages of the arrangements of the prior art, and which will be simple and reliable in operation.

It is another object of my invention to provide an improved excitation circuit for an electric valve included in an electric translating circuit which will minimize oscillations and potential transients in the grid circuit.

It is another object of my invention to provide an improved excitation circuit for an electric valve included in an electric translating circuit which will prevent the direct current saturation of any electromagnetic apparatus included in the excitation circuit.

It is a still further object of my invention to provide an improved excitation circuit for a plurality of electric valves including a plurality of transformer windings mounted on a common magnetic core member by means of which an optimum control of the electric valves may be obtained.

In accordance with my invention in its broadest aspects, an electric valve connected in an electric translating circuit is provided with an excitation circuit including a source of periodic potential and additional means are provided for loading the source during the negative portions of the cycle, in which current will not normally flow in the grid circuit. In one embodiment of my invention, as applied to an electric valve of the vapor electric discharge type, the grid of an electric valve is excited from a source of alternating potential of substantially sinusoidal wave form through a self-saturating transformer which converts the alternating potential into one of peaked wave form. A contact rectifier is connected to by-pass the grid circuit during the negative half cycles to secure the above mentioned objects. In accordance with another modification of my invention the excitation circuit for a plurality of electric valves, which are supplied from a common self-saturating transformer, similarly have contact rectifiers connected to by-pass the several transformer windings during their negative half cycles.

For a better understanding of my invention, together with other and further objects thereof, reference is had to the following description taken in connection with the accompanying drawing, and its scope will be pointed out in the appended claims.

Fig. 1 of the drawing illustrates my invention as applied to the excitation of a pair of electric valves included in an inverter circuit; Fig. 2 shows a modification of my invention as applied to the excitaion of a plurality of electric valves, while Fig. 3 illustrates a modification of the arrangement of Fig. 1 in which the reactance normally included in the self-saturating transformer is provided in an external reactance.

Referring more particularly to Fig. 1 of the drawing, there is illustrated an arrangement embodying my invention for transmitting energy from a direct current circuit 10 to a single phase alternating current circuit 11. This arrangement includes a transformer 12 having a secondary winding 13 connected to the circuit 11 and a primary winding 14 provided with an electrical midpoint connected to the positive side of the direct current circuit and with end terminals connected to the negative side of the direct current circuit through electric valves 15 and 16. A current smoothing reactor 17 is preferably included in the direct current circuit, as illustrated. However, this particular electric translating circuit forms no part of my present invention, but is an arrangement well known in the art. Electric valves 15 and 16 are each provided with an anode, a cathode and a control grid, and may be of any of the several types well known in the art, although I prefer to utilize valves of the vapor electric discharge type. For the sake of simplicity there is illustrated a synchronous dynamo-electric machine 18 connected to the circuit 11 for determining its frequency and wave form.

In order to render the electric valves 15 and 16 successively conductive to transmit alternating current to the circuit 11, their grids are connected to be energized from the circuit 11 through a phase adjusting arrangement 19 and a self-saturating grid transformer 20. The phase adjusting arrangement 19 may be of any of the several types well known in the art, although I have illustrated by way of example an impedance phase shifting circuit comprising an inductive winding 21 provided with an electrical midpoint and energized from the circuit 11, and a reactor 22 and variable resistor 23 connected in parallel to the winding 21. The transformer 20 comprises the magnetic core member 20', a primary winding 24 mounted on a non-saturable leg of the core 20' and connected between the electrical midpoint of the winding 21 and the junction between reactor 22 and resistor 23, as illustrated. The core member 20' also includes a pair of self-saturating legs 25 and 26, upon which are mounted the secondary windings 25' and 26', which supply an alternating potential of peaked wave form. One terminal of each of the windings 25' and 26' are connected together and to the common cathode connection of the valves 15 and 16, while the other terminals are connected to the grids of the valves 15 and 16 respectively. Bias batteries 27 and 28 and current limiting resistors 29 and 30 are preferably included in the grid circuits of the valves 15 and 16, respectively, and in certain cases it may be desirable to connect the capacitors 31 and 32 between the grids and cathodes of the respective valves in order to minimize the effect of potential transients in either the anode or grid circuits of the valves. A contact rectifier 33 and resistor 34 are serially connected across the secondary winding 25' to bypass the grid circuit of the valve 15 during negative half cycles of grid potential. Similarly, the winding 26' is shunted by the contact rectifier 35 and the resistor 36. In case the internal resistances of the windings 25' and 26' are sufficient, resistors 34 and 36 may be omitted. In order to limit the current drawn from the supply circuit during the portion of the cycle when the branches 25 and 26 of the magnetic circuit 20' are saturated, there may be provided an additional magnetic path including the non-saturating branch 37 and an air gap 38. In certain cases, also, it may be desirable to connect a capacitor 39 in parallel to the primary winding of the transformer 20 in order to improve the power factor of the current drawn by the excitation circuit.

The general principles of operation of the above described translating circuit for transmitting energy from the direct current circuit 10 to the alternating current circuit 11 will be well understood by those skilled in the art. In brief, if one of the electric valves, for example, the valve 15 is initially rendered conductive, current will flow through the left-hand portion of the winding 14, producing one half cycle of alternating potential in the circuit 11. Electric valve 16 will be rendered conductive substantially 180 electrical degrees later and at a point in the cycle when the counter-electromotive force of the transformer 12, the phase relation of which is determined by the synchronous machine 18, is effective to transfer the current from the valve 15 to the valve 16. As current flows through the right-hand portion of the winding 14 and the valve 16, a half cycle of alternating potential of opposite polarity will be supplied to the circuit 11. In this manner the current is successively commutated between the valves 15 and 16 and alternating current is supplied to the circuit 11. If, as assumed above, the electric valves 15 and 16 are of the vapor electric type, the use of a grid control potential of peaked wave form has been found particularly advantageous. This is supplied by means of the secondary windings 25' and 26' of the self-saturating transformer 20 which is effective to convert the alternating potential of sinusoidal wave form derived from the circuit 11 through the impedance phase shifting circuit 19 into one of peaked wave form as is well understood by those skilled in the art.

When one of the electric valves, for example, valve 15, is conductive, and during the interval in which its grid is positive, the output of the winding 25' will be rectified, as will be well understood by those skilled in the art. During the negative half cycle, however, current cannot flow in the grid circuit with the result that the winding 25' will be open circuited. By connecting the contact rectifiers 33 and 35 across the windings 25' and 26', respectively, these windings are loaded also during their negative half cycles. Obviously, the resistors 34 and 36 serve to balance the current flowing during the negative and positive half cycles, and, in case the internal resistances of the windings 25' and 26' are high compared to the external resistance of the grid circuit, these resistors may be omitted. This loading of the transformer windings during their negative half cycles prevents oscillations between these windings and the grid-cathode capacitors 32; minimizes transients in the grid circuits occasioned by surges in adjacent circuits, or by other causes; diverts the transformer flux from the inactive windings to the active ones, that is, the ones supplying positive impulses, and thus provides a more positive grid control, and prevents direct current saturation of any portion of the transformer circuit.

In Fig. 2 there is illustrated an extension of my invention to an arrangement in which a plurality of electric valves are excited with grid potentials of the same phase relation from the same transformer; that is, the valves 15 and 15' are excited with alternating potentials of peaked wave form and of the same phase relation from the windings 25' and 25", while the grids of the valves 16 and 16' are similarly excited from the windings 25' and 26", respectively, with alternating potentials opposite in phase. The contact rectifiers 33 and 33' and 35 and 35' tend to load the windings 25' and 25" and 26' and 26", respectively, during their negative half cycles. This loading of the secondary windings of the saturating transformer accomplishes the same results as discussed in connection with Fig. 1.

The excitation circuit shown in Fig. 3 is similar to that of Fig. 1 with the exception that the internal reactance of the transformer provided by the auxiliary core member 37 and air gap 38 is replaced by an external reactance device 40, which is effective to limit the current drawn from the source of grid excitation during periods when the core member is saturated.

While I have described what I at present consider preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In an electric translating circuit including a grid controlled vapor electric valve for controlling the flow of current therein, a source of alternating potential of substantially sinusoidal wave form, electromagnetic means for converting said sinusoidal potential into one of peaked wave form, a grid circuit for said valve energized therefrom, and means for loading said electromagnetic means during the negative half cycle of the grid potential.

2. In an electric translating circuit including a grid controlled electric valve for controlling the flow of current therein, a grid circuit for said valve including self-saturating electromagnetic means connected to a source of alternating potential, and rectifying means connected to bypass said grid circuit thereby loading said electromagnetic means during the negative half cycle of said alternating potential.

3. In an electric translating circuit including a grid controlled vapor electric valve for controlling the flow of current therein, a source of alternating potential of substantially sinusoidal wave form, a self-saturating transformer for converting said sinusoidal potential into one of peaked wave form, a grid circuit for said valve energized from said transformer, and a contact rectifier and a resistor serially connected to bypass said grid circuit during the negative half cycle of the grid potential.

4. In an electric translating circuit, a vapor electric valve provided with an anode, a cathode, and a control grid for controlling the flow of current therein, a source of alternating potential of substantially sinusoidal wave form, a self saturating transformer for converting said sinusoidal potential into one of peaked wave form, a grid circuit for said valve energized from said transformer and including a negative bias battery and a current limiting resistor, a contact rectifier and a resistor serially connected to bypass said grid circuit during the negative half cycle of the grid potential, and a capacitor connected between said grid and cathode to absorb transients in said grid circuit.

5. An electric translating system comprising a supply circuit, a load circuit, one of said circuits being an alternating current circuit, means including an electric valve for transmitting energy between said circuits, said valve being provided with an anode, a cathode, and a control grid, a grid circuit for said valve including a source of alternating potential synchronous with said alternating current circuit, and rectifying means connected to bypass said grid circuit during the negative half cycle of said alternating potential.

6. In an electric translating circuit, a plurality of grid controlled electric valves for controlling the flow of current therein, a grid circuit for each of said valves, a source of alternating potential, electro-magnetic means energized from said source and provided with a separate winding for energizing each of said grid circuits, and rectifying means for loading each of said windings during its negative half cycles.

7. In an electric translating circuit, a plurality of grid controlled vapor electric valves for controlling the flow of current therein, a grid circuit for each of said valves, a source of alternating potential, a self-saturating transformer energized from said source and provided with a separate winding for exciting each of said grid circuits, and a contact rectifier connected in shunt to each of said windings to bypass the corresponding grid circuit during the negative half cycles of grid potential.

8. In an electric translating circuit, a grid controlled vapor electric valve for controlling the flow of current therein, a source of alternating potential of substantially sinusoidal wave form, a self-saturating transformer for converting said sinusoidal potential into one of peaked wave form, said transformer being provided with an auxiliary non-saturating magnetic path to limit the current drawn from said source during those portions of the cycle when the main magnetic path is saturated, a grid circuit for said valve energized from said transformer, and means for loading said transformer during the negative half cycle of the grid potential.

9. In an electric translating circuit, a grid controlled vapor electric valve for controlling the flow of current therein, a source of alternating potential of substantially sinusoidal wave form, a self saturating transformer for converting said sinusoidal potential into one of peaked wave form, a grid circuit for said valve energized from said transformer, and a reactance device in series with said saturating transformer to limit the current drawn from said source.

10. In an electric translating circuit, a grid controlled vapor electric valve for controlling the flow of current therein, a source of alternating potential of substantially sinusoidal wave form, a self-saturating transformer for converting said sinusoidal potential into one of peaked wave form, a grid circuit for said valve energized from said transformer, a capacitor connected across said transformer to improve the power factor of the current drawn from said source, and a contact rectifier connected to load said transformer during the negative half cycle of said grid potential.

11. An electric translating circuit including a plurality of grid controlled electric valves for controlling the flow of current therein, a grid transformer including a plurality of core sections, a secondary winding for each of said core sections connected to excite the grid of one of said valves, and means for diverting the transformer flux to those core sections carrying active windings comprising means for substantially short circuiting said windings during their half cycles of negative potential.

12. An electric translating circuit including a plurality of grid controlled electric valves for controlling the flow of current therein, a grid transformer provided with a plurality of secondary windings each connected to excite the grid of one of said valves, and means for minimizing the induced transients between the grid circuits of said valves comprising rectifying means connected to substantially short circuit each of said windings during their half cycles of negative potential.

BURNICE D. BEDFORD.